US012701210B2

(12) United States Patent
Zhang et al.

(10) Patent No.: US 12,701,210 B2
(45) Date of Patent: Aug. 4, 2026

(54) BINOCULAR DISPARITY CORRECTION SYSTEM

(71) Applicant: Meta Platforms Technologies, LLC, Menlo Park, CA (US)

(72) Inventors: Dong Zhang, Coquitlam (CA); Yujia Huang, Kirkland, WA (US); Peicong Wu, Bellevue, WA (US); Turhan Karadeniz, Oakland, CA (US); Vadim Goncharuk, Renton, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 85 days.

(21) Appl. No.: 18/521,977

(22) Filed: Nov. 28, 2023

(65) Prior Publication Data

US 2025/0175585 A1 May 29, 2025

(51) Int. Cl.
| | |
|---|---|
| *H04N 13/327* | (2018.01) |
| *H04N 13/344* | (2018.01) |
| *H04N 13/383* | (2018.01) |
| *H04N 13/398* | (2018.01) |

(52) U.S. Cl.
CPC ......... *H04N 13/327* (2018.05); *H04N 13/344* (2018.05); *H04N 13/383* (2018.05); *H04N 13/398* (2018.05)

(58) Field of Classification Search
CPC .... H04N 13/32; H04N 13/383; H04N 13/344; H04N 13/398
USPC ......................................................... 348/143
See application file for complete search history.

(56) References Cited

U.S. PATENT DOCUMENTS

| | | | | |
|---|---|---|---|---|
| 10,817,052 | B1 * | 10/2020 | Lu | G06F 3/013 |
| 11,215,828 | B1 | 1/2022 | Yu et al. | |
| 2016/0165229 | A1 * | 6/2016 | Kao | H04N 9/12 |
| | | | | 348/189 |
| 2018/0074578 | A1 * | 3/2018 | Robbins | G06T 11/60 |
| 2021/0217147 | A1 * | 7/2021 | Edwin | H04N 13/344 |
| 2022/0377312 | A1 * | 11/2022 | Samples | H04N 13/344 |

(Continued)

FOREIGN PATENT DOCUMENTS

| | | | | | |
|---|---|---|---|---|---|
| EP | 1638345 | A1 * | 3/2006 | ............. | H04N 17/04 |
| JP | 2011085860 | A * | 4/2011 | ............. | G03B 21/00 |

(Continued)

OTHER PUBLICATIONS

European Search Report for European Patent Application No. 24191163.5, dated Dec. 2, 2024, 9 pages.

(Continued)

*Primary Examiner* — Behrooz M Senfi
(74) *Attorney, Agent, or Firm* — Greenberg Traurig, LLP

(57) ABSTRACT

The disclosed computer-implemented method may include displaying a first test pattern on a first display and a second test pattern on a second display and capturing the displayed first test pattern and the displayed second test pattern. The method may further include determining a deviation between at least one of the captured first test pattern and the first test pattern or the captured second test pattern and second test pattern. The method may also include adjusting output to at least one of the first display or the second display based on the determined deviation. Various other methods, systems, and computer-readable media are also disclosed.

20 Claims, 12 Drawing Sheets

(56) References Cited

U.S. PATENT DOCUMENTS

| | | | | |
|---|---|---|---|---|
| 2023/0239455 A1 * | 7/2023 | Churin | ................ | H04N 13/398 |
| | | | | 348/53 |
| 2024/0179284 A1 * | 5/2024 | Callens | ................... | G02B 6/34 |

FOREIGN PATENT DOCUMENTS

| | | | | | |
|---|---|---|---|---|---|
| WO | WO-2013055310 A1 * | 4/2013 | ............. | G09G 3/006 |
| WO | WO-2020203236 A1 * | 10/2020 | ............. | G06T 5/003 |

OTHER PUBLICATIONS

Office Action mailed Mar. 16, 2026 for European Patent Application No. 24191163.5, filed on Jul. 26, 2024, 12 pages.

* cited by examiner

Method
100

452B

452A

454

800

1200

1202

1203

1204

1206

1205

1208

1210

BINOCULAR DISPARITY CORRECTION SYSTEM

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
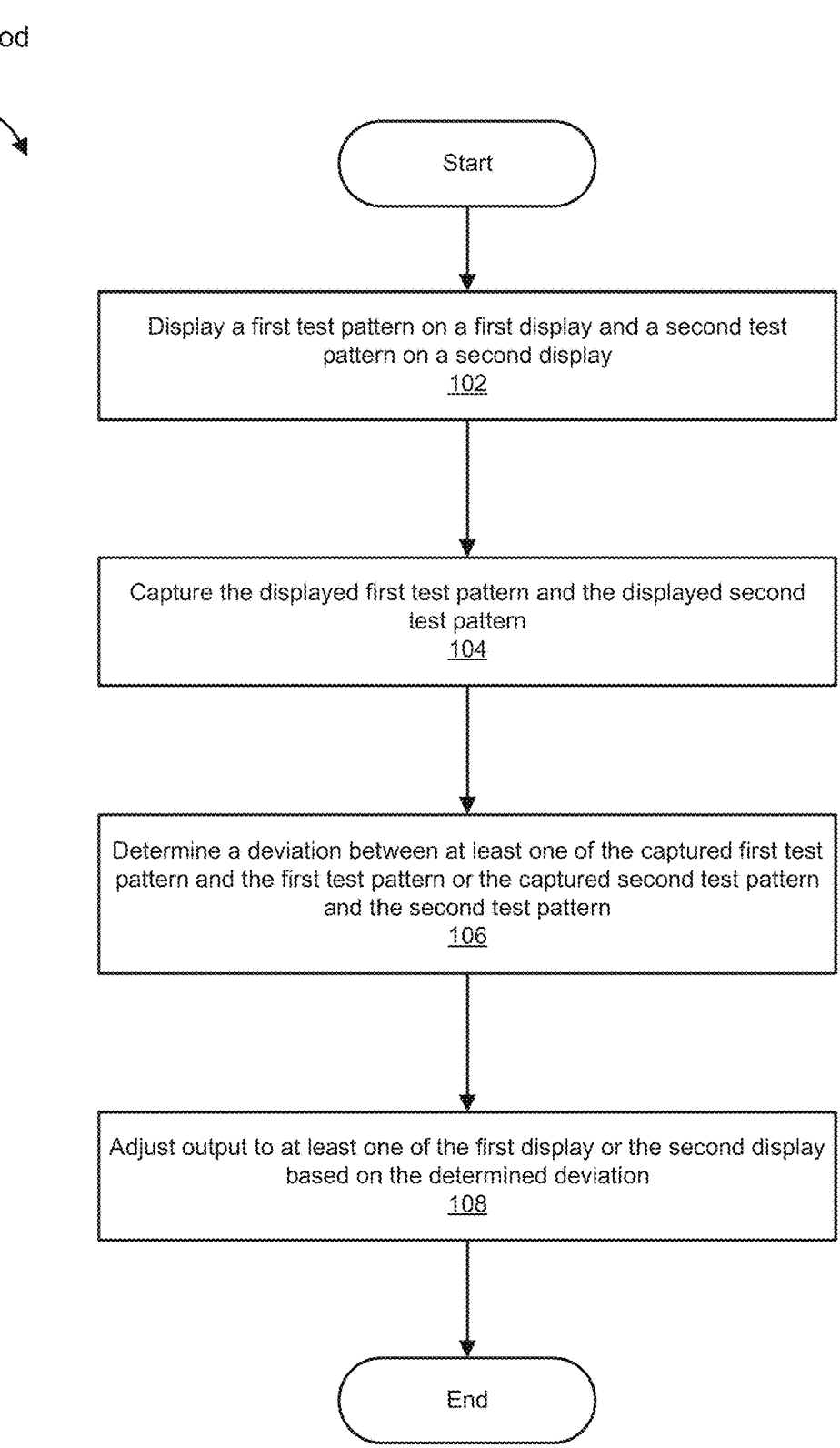
FIG. 1 is a flow diagram of an exemplary method for binocular disparity correction.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality devices often take on a wearable form factor with near-eye optics in order to place displays near a user's eyes. For example, the user may wear glasses or other head-mounted apparatus that places a display, such as a waveguide display, near the user's eyes. The displays may be placed at a desired orientation with respect to the user's eyes in order to correctly display content to the user. However, due to various factors such as the user's head size, body movement of the user, tipping, tilting, etc., the displays may become misaligned from the desired orientation. Such misalignment may cause distortion, changes in color, lighting and/or other visual defects as viewed by the user.

Some artificial reality devices may provide for corrections to the aforementioned visual defects. For example, a camera (e.g., a disparity camera) may capture the displayed content, to identify visual defects, and modify the content to counter the visual defects. However, identifying the visual defects and further determining how to modify the content to counter the visual defects may be challenging when using a disparity camera.

The present disclosure is generally directed to binocular disparity detection and correction. As will be explained in greater detail below, embodiments of the present disclosure may capture a first test pattern on a first display and capture a second test pattern on a second display. By determining deviations between the captured first and second test patterns and the respective original first and second test patterns, the systems and methods described herein may adjust output to the first and/or second displays to correct visual defects such as binocular disparity. Accordingly, embodiments of the present disclosure advantageously provides efficient and accurate binocular disparity correction. The systems and methods provided herein advantageously improves the functioning of a computer by reducing calculations and computing resources required for detecting and correcting binocular disparity and other related visual defects. Moreover, the systems and methods provided herein advantageously improve the technical fields of near-eye optics and waveguide displays.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-12, detailed descriptions of binocular disparity detection and correction. Detailed descriptions of example methods for binocular disparity detection and correction will be provided in connection with FIGS. 1, 4, and 8. Detailed descriptions of example systems for binocular disparity detection and correction will be provided in connection with FIGS. 2, 3, and 8. Detailed descriptions of frame synchronization as used in binocular disparity detection/correction will be provided in connection with FIGS. 5-7. In addition, detailed descriptions of example devices will also be provided in connection with FIGS. 9-12.

FIG. 1 is a flow diagram of an exemplary computer-implemented method 100 for binocular disparity detection and correction. The steps shown in FIG. 1 may be performed by any suitable computer-executable code and/or computing system, including the system(s) illustrated in FIGS. 2, 3, 5 and/or 8. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may display a first test pattern on a first display and a second test pattern on a second display. For example, a pattern module 208 in FIG. 2 may display a test pattern 252 on a display 222.

In some embodiments, the term "test pattern" may refer to an image or frame for a display that may include one or more visual features that may be identified (e.g., detected and locations determinable when the test pattern is viewed) with relative accuracy, and the locations of which (e.g., with respect to a reference coordinate system of the image) may be known. Examples of test patterns include, without limitation, dot patterns (e.g., having various dots at various locations), line patterns, particular shapes in particular locations, etc.

Figure 2:
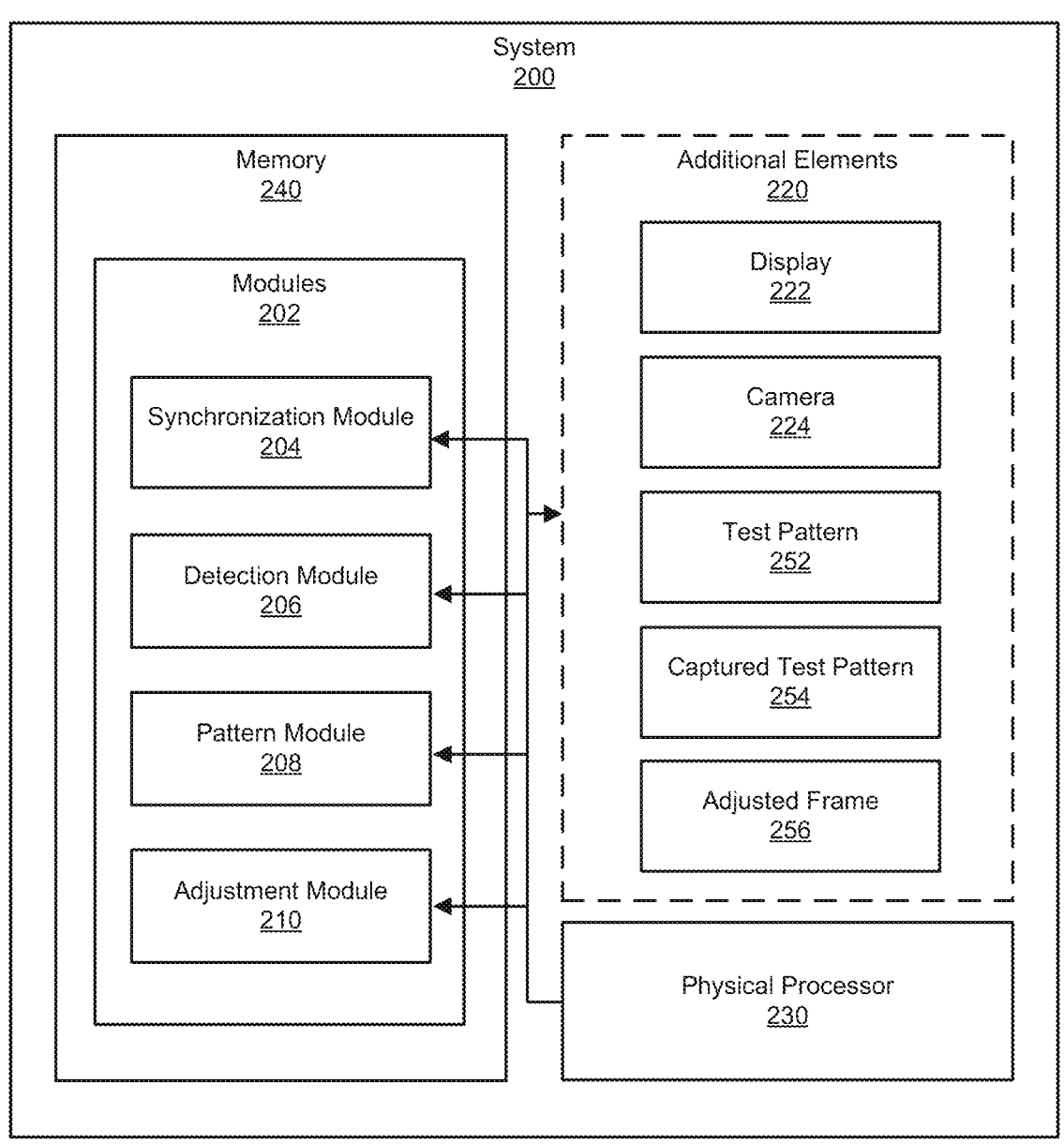
FIG. 2 is a block diagram of an exemplary system for binocular disparity detection and correction.

Various systems described herein may perform step 102. FIG. 2 is a block diagram of an example system 200 for binocular disparity detection and correction. As illustrated in this figure, example system 200 may include one or more modules 202 for performing one or more tasks. As will be explained in greater detail herein, modules 202 may include a synchronization module 204, a detection module 206, pattern module 208, and an adjustment module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 5 (e.g., a system 500 and/or a host 570). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as display 222, a camera 224, test pattern 252, a captured test pattern 254, and an adjusted frame 256. Test pattern 252, captured test pattern 254, and/or adjusted frame 256 may be stored on a local storage device, such as memory 240, or may be accessed remotely. Display 222 may represent any display device, including one or more display devices such as LCOS and/or microLED-based displays, as will be described further below. Camera 224 may represent any optical sensor such as a rolling shutter camera and/or a global shutter camera, and may further include additional components as will be described further below. Test pattern 252 may correspond to one or more visual patterns (e.g., a separate visual pattern for each display) that may be generated with particular visual features for detecting binocular disparity and/or other visual distortions, as will be described further below. Captured test pattern 254 may represent image data captured by camera 224 of test pattern 252 as displayed on display 222, as will be described further below. Adjusted frame 256 may represent one or more frames rendered for display on display 222 that may incorporate binocular disparity corrections and/or other visual defect corrections before being displayed by display 222, as will be described further below.

Figure 3:
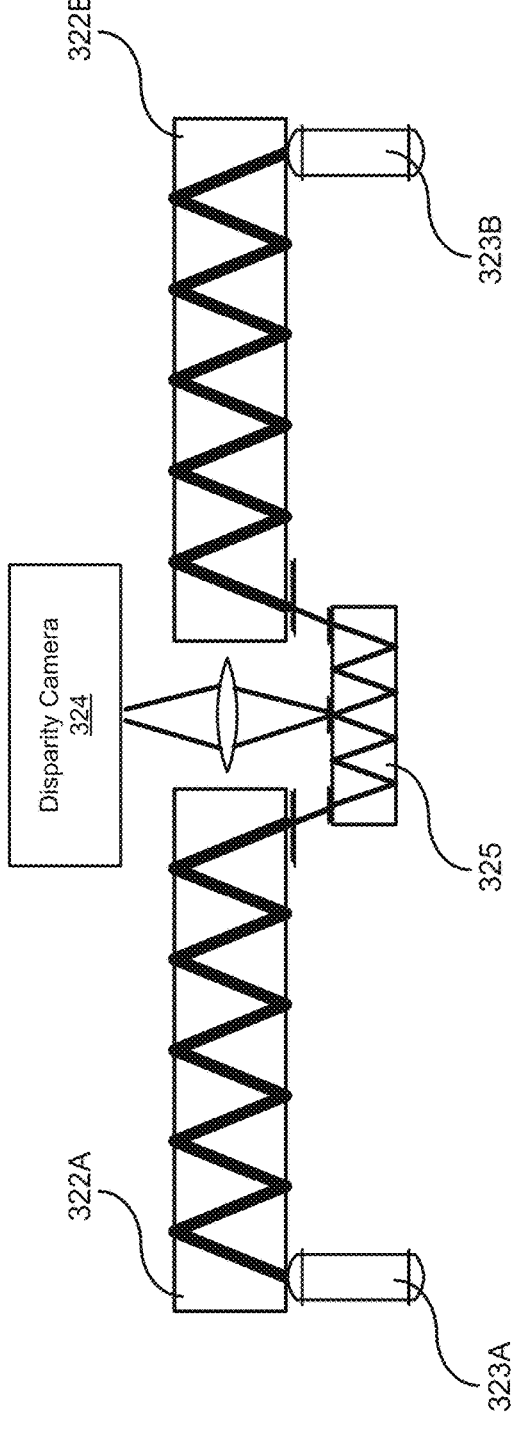
FIG. 3 is a diagram of an exemplary device having a binocular display and a disparity sensor.

Example system 200 in FIG. 2 may be implemented in a variety of ways. For example, all or a portion of example system 200 may represent one or more communicatively coupled computing devices. FIG. 3 illustrates an example device 300 corresponding to system 200.

FIG. 3 illustrates device 300 that may correspond to a binocular display device, such as a head-mounted display (HMD) or a near-eye display having a display for each eye. Device 300 includes a display 322A (e.g., a first display or a left display for a left eye) and a display 322B (e.g., a second display or a right display for a right eye). In some implementations, display 322A and/or display 322B may correspond to optical waveguides (e.g., a structure that guides waves at optical frequencies by total internal reflection at an interface between mediums having different refractive indices). For example, FIG. 3 generally illustrates how optical waves may be reflected.

As further illustrated in FIG. 3, a projector 323A (e.g., a first projector or a left projector) may project optical waves to display 322A, and a projector 323B (e.g., a second projector or a right projector) may project optical waves to display 322B. Projector 323A and projector 323B may project different frames (e.g., for each eye) based on binocular vision. Thus, display 322A, projector 323A, display 322B, and projector 323B may collectively correspond to display 222. In FIG. 3, display 322A and projector 323A may be integrated into a left side of a frame (see, e.g., display 915(A) in FIG. 9), and display 322B and projector 323A may be integrated into a right side of the frame (see, e.g., display 915(B) in FIG. 9). In other implementations, display 322A and/or display 322B may correspond to other types of displays which further may not use a corresponding projector (e.g., projector 323A and/or projector 323B).

Device 300 further includes a disparity camera 324 and a disparity sensor waveguide 325. Disparity camera 324 may correspond to an optical sensor for capturing image data from disparity sensor waveguide 325. Disparity sensor waveguide 325 may correspond to a waveguide configured to propagate optical waves from both display 322A and display 322B. As illustrated in FIG. 3, a left eye image displayed by display 322A may propagate from a left side of disparity sensor waveguide 325 to a center of disparity sensor waveguide 325, which may then be focused by a lens or other optical element and captured by disparity camera 324. Similarly, a right eye image displayed by display 322B may propagate from a right side of disparity sensor waveguide 325 to the center of disparity sensor waveguide 325, which may then be focused by the lens/optical element and captured by disparity camera 324. Thus, disparity camera 324 and disparity sensor waveguide 325 may collectively correspond to camera 224.

In FIG. 3, disparity camera 324 and disparity sensor waveguide 325 may be integrated into a nose bridge of the frame to be centrally located between display 322A and display 322B and capture both displays. Having disparity camera 324 that can capture both displays may reduce components needed in the frame as well as reduce design complexity, although in other implementations other configurations, such as multiple cameras, cameras in different locations along the frame, etc., may be used.

Figures 4A, 4B, 4C:
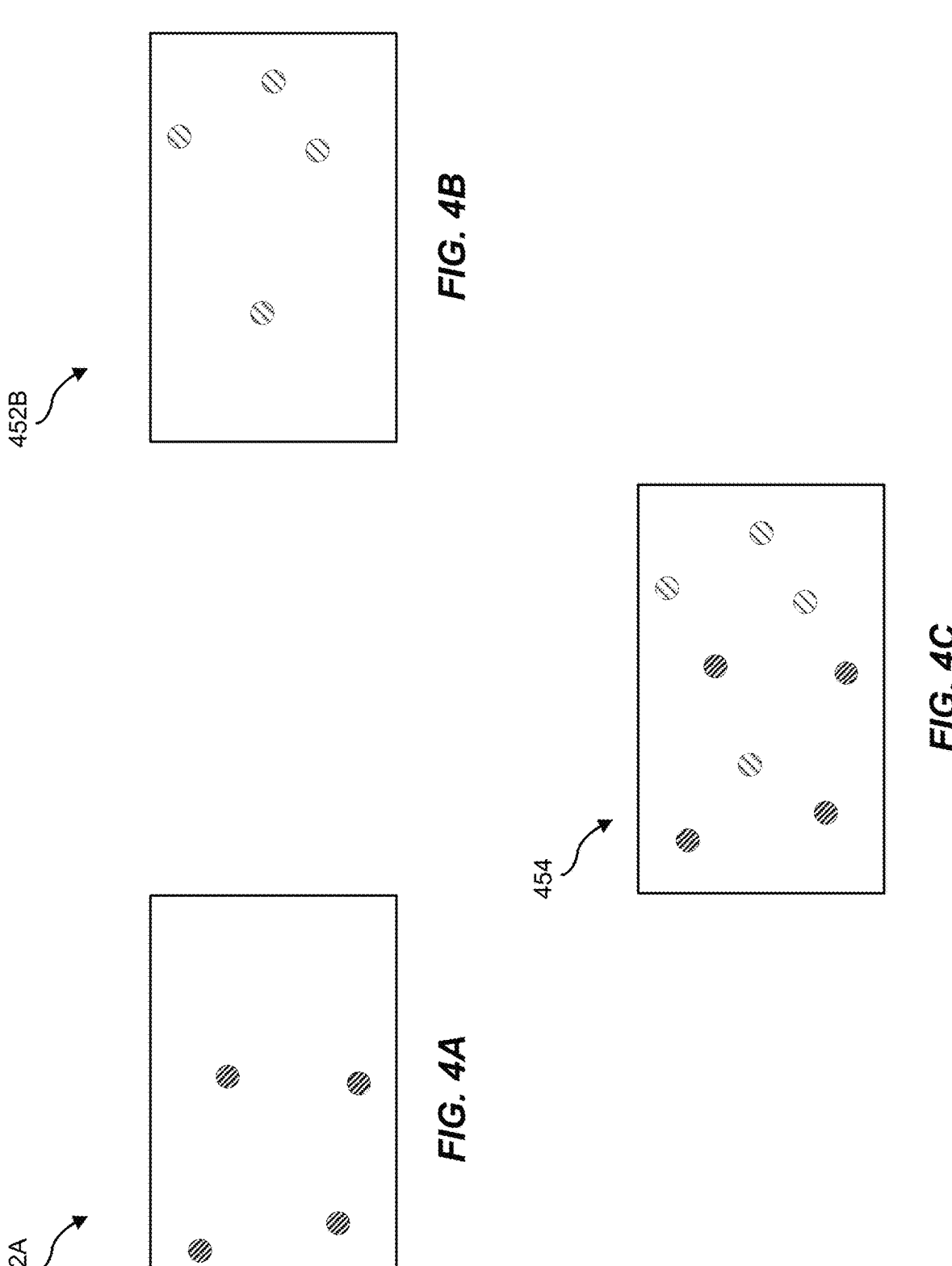
FIGS. 4A-C are illustrations of exemplary test patterns.

Returning to FIG. 1, for step 102, display 322A may display the first test pattern and display 322B may display the second test pattern. FIGS. 4A-4B illustrate example test patterns. FIG. 4A illustrates a test pattern 452A (e.g., a left test pattern that may be displayed on a left display such as display 322A) and FIG. 4B illustrates a test pattern 452B (e.g., a right test pattern that may be displayed on a right display such as display 322B). As illustrated in FIGS. 4A-4B, test pattern 452A and test pattern 452B may each correspond to different iterations of a dot pattern. FIGS. 4A-4B illustrate simplified examples of test patterns, although in other examples, other test patterns may be used, such as having more or fewer dots, different shapes and/or colors, gradients, and/or other distinguishable visible features.

Although test pattern 452A and test pattern 452B may correspond to pre-defined test patterns, in some implementations test pattern 452A and/or test pattern 452B may be dynamically generated as needed, such as by pattern module 208. Test pattern 452A may be different from test pattern 452B, and more specifically may be high-probabilistically different. For instance, pattern module 208 may randomly or pseudo-randomly determine locations of the dots in test pattern 452A and/or test pattern 452B but may select locations with a high-probabilistic difference between the two test patterns to reduce a likelihood of a dot in test pattern 452A being located near (e.g., within a statistical distance threshold) a dot in test pattern 452B in the same coordinate system (e.g., a frame), as will be explained further below.

Returning to FIG. 1, the systems described herein may perform step 102 in a variety of ways. In some examples, the test patterns may be displayed in a manner to reduce a user noticing the test patterns. In some examples, eye-tracking (as will be explained further below with respect to FIGS. 11 and 12) and/or other user detection may be used to display the test patterns in a non-obtrusive manner. For example, the first test pattern and/or the second test pattern may be displayed when a user blink is detected, and/or when a user gaze is detected away from at least one of the displays. In other examples, the first and/or second test pattern may be hidden in an output frame such that the user may see content normally, and test pattern features may be embedded in the output frame (e.g., at a particular color and/or color channel) so as not to detract from the content, but remain identifiable. In yet other examples, the first test pattern may be displayed asynchronously with the second test pattern.

Continuing with FIG. 1, at step 104 one or more of the systems described herein may capture the displayed first test pattern and the displayed second test pattern. For example, camera 224 may capture, as captured test pattern 254, test pattern 252 as displayed on display 222.

To capture displayed frames and correctly associate the captured frames with the rendered frames, synchronization module 204 may implement a timing scheme. In one example, the timing scheme may correspond to a time synchronization protocol such as precision time protocol (PTP). The timing scheme may be implemented with a time synchronizer (TS) module, such as TS 504 in FIG. 5.

Figure 5:
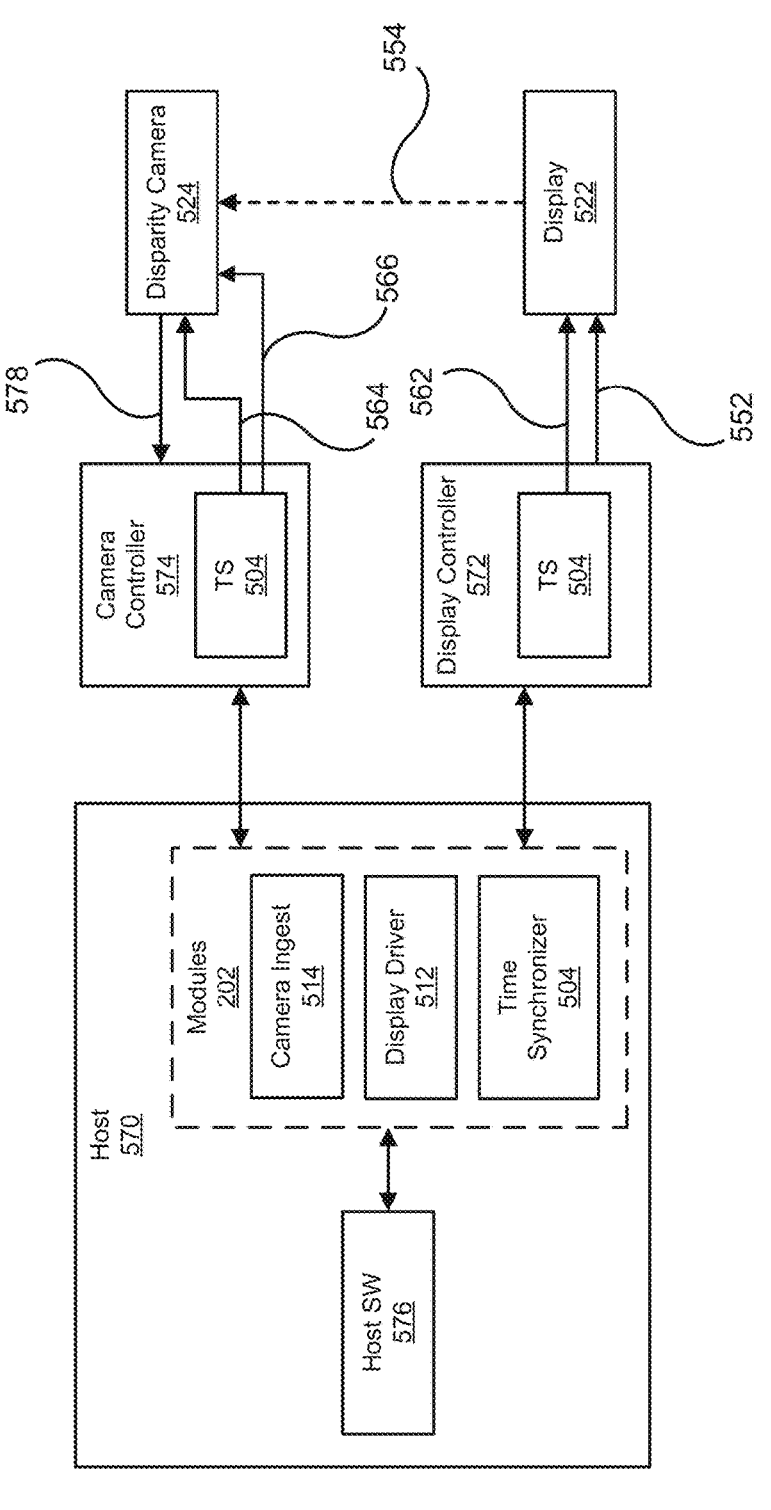
FIG. 5 is a diagram of a device having a rolling display and a disparity camera.

FIG. 5 illustrates system 500 which may include a host 570, a disparity camera 524 (which may correspond to camera 224), and a display 522 (which may correspond to display 222). Host 570 may be a computing device that interfaces with disparity camera 524 via a camera controller 574, and interfaces with display 522 via a display controller 572. Host 570 may include a host software 576 which may correspond to an artificial reality software that interfaces with camera controller 574 and/or display controller 572 via modules 202. Modules 202 may include a camera ingest 514, a display driver 512, and time synchronizer 504. Camera ingest 514 may correspond to software and/or hardware modules for receiving image data from and otherwise interfacing with disparity camera 524. Display driver 512 may correspond to software and/or hardware modules configuring and otherwise interfacing with display 522. Time synchronizer 504 (which may correspond to synchronization module 204) may correspond to software and/or hardware modules for implementing a timing scheme for disparity camera 524 and display 522.

Disparity camera 524 may correspond to an image sensor such as a rolling shutter camera, a global shutter camera, etc. that may be orientated to capture image data from display 522. Camera controller 574 may provide an interface for controlling disparity camera 524 as well as implement TS 504. In some examples, disparity camera 524 may be a rolling shutter camera capable of capturing an image (and/or series of images/frames for video) by scanning across the image rather than the entire image at once. In some examples, disparity camera 524 may be a global shutter camera capable of capturing an entire image in one instance.

Display 522 may correspond to a rolling display, a waveguide, and/or other display such as a microLED display. Display controller 572 may provide an interface for controlling display 522 as well as implement TS 504. In some examples, disparity camera 524 may be a rolling display capable of displaying an image (and/or series of images/frames for video) by displaying across the image rather than the entire image at once.

In some examples, synchronizing disparity camera 524 with display 522 may further include configuring disparity camera 524 and/or display 522 in order to match timing windows for displaying frames (and/or portions thereof) and capturing frames (and/or portions thereof). For example, camera ingest 514 and/or camera controller 574 may set a camera frequency (e.g., frames-per-second) of disparity camera 524 to twice a display frequency of display 522 (which may be set by display driver 512 and/or display controller 572) such that disparity camera 524 may capture frames at twice the rate that display 522 displays frames.

In some examples, camera ingest 514 and/or camera controller 574 may set an exposure of disparity camera 524 to match a display persistence time of display 522 (which may be set by display driver 512 and/or display controller 572). For instance, the exposure of disparity camera 524 may be set to be less than or equal to the display persistence time (e.g., an amount of time that display 522 displays a frame or portion thereof). In some examples, the exposure may be set to be greater than or to exceed the display persistence time. A row-to-row time (e.g., an amount of time between display 522 displaying a row of a frame and a next row of the frame) for display 522 may match a row-to-row time for disparity camera 524 (e.g., an amount of time between disparity camera 524 capturing a row of a frame and a next row of the frame). The row-to-row times may also correspond to a rolling start window (e.g., an amount of time for disparity camera 524 to cycle through every row). For example, the rolling start window may be equal to the row-to-row time multiplied by a number of rows.

Figure 6:
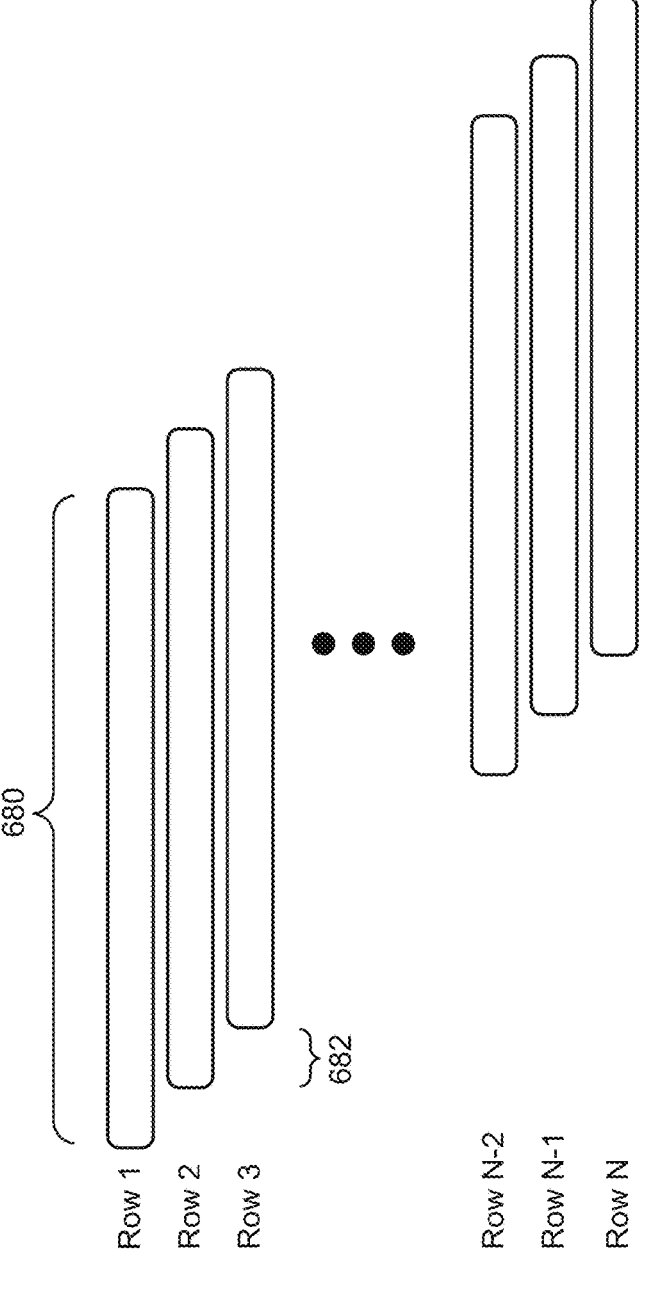
FIG. 6 is a diagram of rows of a frame of content.

FIG. 6 further illustrates a diagram of a frame 600 that may be displayed by a rolling display. Rather than displaying a single full frame at one time, a rolling display may asynchronously display portions of the frame, for example cycling through the portions over time (which may overlap) until the entire frame has been displayed. For example, frame 600 may be divided into rows (e.g., Rows 1-N).

In some embodiments, the term "row" may refer to a portion of a frame (e.g., an image which may be part of a sequence of images for a video). For example, if representing a frame as a matrix of pixel (color) values, a row as used herein may refer to a row and/or column of this matrix. In some examples, a row may refer to a portion of a row and/or column of this matrix, multiple rows and/or columns, or other subsets of this matrix. In some examples, a row may refer to an entire frame (e.g., the entire matrix). In some examples, a row may refer to a portion of a frame as displayed or will be displayed, such as a rendered image and/or may refer directly to the corresponding display area of a display. In some examples, a row may refer to a portion of a frame as will be captured, such as a frame captured by an image sensor and/or may refer directly to the corresponding subset of sensors from the image sensor.

As illustrated in FIG. 6, a display persistence 680 may refer to how long a given row is displayed by a rolling display such as display 522. In FIG. 6, display persistence 680 may be uniform or otherwise consistent for all rows 1-N, although in other examples, display persistence 680 may vary between rows. In addition, FIG. 6 illustrates a row-to-row time 682 corresponding to a time delay between displaying a row and its neighboring row. Although FIG. 6 illustrates a uniform or otherwise consistent row-to-row time 682 between all rows 1-N, in other examples row-to-row time 682 may vary.

A rolling display such as display 522 may therefore display frame 600 as a time-staggered series of rows 1-N. Thus, a camera such as disparity camera 524 may need to synchronize with display 522 to properly capture frame 600. For example, a global shutter camera may need to capture frame 600 at a moment when all of rows 1-N are simultaneously displayed. A rolling shutter camera may capture rows 1-N as they are displayed.

Triggers may be used to control timing for displaying and capturing frames. In one example, display controller 572 may trigger display 522 to display a content frame 552 via a display trigger 562. Display 522 may accordingly display a content frame 552, which in some examples may correspond to test pattern 252. In some examples, display 522 may display content frame 552 in rows. TS 504 may send (via display controller 572) display trigger 562 to display 522 based on the timing scheme. For example, display trigger 562 may correspond to a modulo value of a timestamp value of the timing scheme. In some examples, the modulo value may be designated for display trigger 562. Additionally, in some examples, display controller 572 may save a display timestamp corresponding to triggering display 522 to display content frame 552. In some examples, the display timestamp may correspond to display trigger 562 (e.g., the timestamp value associated with display trigger 562).

Figure 7:
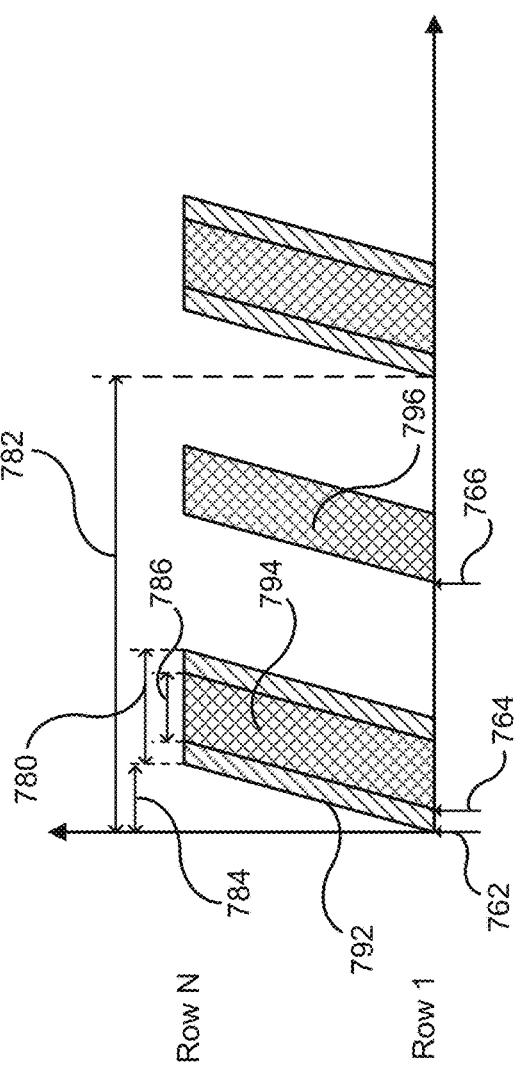
FIG. 7 is a graph of synchronization between a display and a sensor.
Figure 7:
Figure 7:

FIG. 7 illustrates a timing diagram 700 of displaying and capturing rows (e.g., rows 1-N as in FIG. 6). An x-axis may correspond to time and a y-axis may correspond to rows. A display, such as display 522, may display row 1 in response to a display trigger 762 (which may correspond to display trigger 562). The display may continue to display rows 2-N over time as shown. A rolling start window 784 may correspond to a time lapse between starting the display of row 1 and starting the display of row N. A persistence 780 may correspond to how long a frame or row is displayed. A period 782 may correspond to how often frames are displayed (e.g., a period of 11 ms until a next frame is displayed may correspond to 90 frames-per-second (fps)). A display roll-out 792 (illustrated in FIG. 7 as non-contiguous shaded portions) may correspond to a display time of a frame, and more specifically each of rows 1-N. Display roll-out 792 shows that each of rows 1-N are displayed for an amount of time corresponding to persistence 780, and that row N may stop being displayed at a time approximately equal to a sum of persistence 780 and rolling start window 784 after starting display of row 1. In addition, although not shown in FIG. 7, in some examples, displaying each of rows 1-N may be triggered by a respective display trigger 762 and corresponding display timestamps may be saved for each row.

For capturing frames, camera controller 574 may trigger disparity camera 524 to capture, via a capture trigger 564, captured content frame 554 (which in some examples may correspond to captured test pattern 254) from display 522. In some examples, disparity camera 524 may capture captured content frame 554 in rows. TS 504 may send (via camera controller 574) capture trigger 564 to disparity camera 524 based on the timing scheme. For example, capture trigger 564 may correspond to a modulo value of a timestamp value of the timing scheme. In some examples, the modulo value may be designated for capture trigger 564, which may be a modulo value selected to be offset from the modulo value of display trigger 562. Additionally, in some examples, camera controller 574 may save a capture timestamp corresponding to triggering disparity camera 524 to capture captured content frame 554. In some examples, the capture timestamp may correspond to capture trigger 564 (e.g., the timestamp value associated with capture trigger 564).

FIG. 7 illustrates a capture trigger 764 which may correspond to capture trigger 564. As shown in FIG. 7, capture trigger 764 may be offset from display trigger 762. A sensor exposure 794 illustrates how a rolling shutter camera, such as disparity camera 524, may capture a frame in rows (e.g., rows 1-N). An exposure 786 may correspond to how long a frame or row is captured by corresponding sensors. Thus, sensor exposure 794 illustrates how the rows of the frame may be captured. Further, as shown in FIG. 7, sensor exposure 794 may not exceed (e.g., extend outside the boundaries of) display roll-out 792 such that the camera is capturing the displayed frame without capturing extraneous image data. The offset of capture trigger 764 and/or exposure 786 may be accordingly selected to ensure that sensor exposure 794 may not exceed display roll-out 792. For example, exposure 786 may be less than persistence 780.

In other examples, based on a type of camera, sensor exposure 794 may have a different shape, such as a rectangle corresponding to a global shutter camera (e.g., by having all rows 1-N captured over the same time period). In such examples, the offset for capture trigger 764 and/or exposure 786 may accordingly be selected to ensure that sensor exposure 794 may not exceed display roll-out 792. In addition, although not shown in FIG. 7, in some examples, capturing each of rows 1-N may be triggered by a respective capture trigger 764 and corresponding capture timestamps may be saved for each row.

In some examples, unwanted visual effects in a captured content frame (e.g., captured test pattern 254) may be attributable to noise, such as ambient light and/or other sources of light. To detect background light and distinguish from light from display 222, camera 224 may capture a background light frame corresponding to background light for when the display is not actively displaying content. In some examples, ambient light may be passively filtered, such as a coating on a lens of camera 224 and/or other filter in front of the lens.

For example, camera controller 574 may trigger disparity camera 524 to capture, via a background light trigger 566, a captured background light frame. In some examples, disparity camera 524 may capture the captured background light frame in rows. TS 504 may send (via camera controller 574) background light trigger 566 to disparity camera 524 based on the timing scheme. For example, background light trigger 566 may correspond to a modulo value of a timestamp value of the timing scheme. In some examples, the modulo value may be designated for background light trigger 566, which may be a modulo value selected to be offset from the modulo value of capture trigger 564 and/or display trigger 562. Additionally, in some examples, camera controller 574 may save a background light timestamp corresponding to triggering disparity camera 524 to capture the captured background light frame. In some examples, the background light timestamp may correspond to background light trigger 566 (e.g., the timestamp value associated with background light trigger 566).

FIG. 7 illustrates a background light trigger 766 which may correspond to background light trigger 566. As shown in FIG. 7, background light trigger 766 may be offset from capture trigger 764. A sensor exposure 796 illustrates how the rolling shutter camera (e.g., disparity camera 524), may capture a frame in rows (e.g., rows 1-N). Settings for sensor exposure 796 may be similar to that of sensor exposure 794 as reflected by their similar shapes. Thus, sensor exposure 796 illustrates how the rows of the background light frame may be captured (e.g. outside of display roll-out 792). The offset of background light trigger 766 may be accordingly selected to ensure that sensor exposure 796 may not overlap display roll-out 792. The offset may be based on, for example, half of period 782 or other appropriate value corresponding to when the display is not actively displaying a content frame. Additionally, although FIG. 7 illustrates background light trigger 766 occurring after the display finishes displaying the corresponding content frame, in some examples background light trigger 766 may occur before the display begins displaying the corresponding content frame.

In addition, although not shown in FIG. 7, in some examples, capturing background light for each of rows 1-N may be triggered by a respective background light trigger 766 and corresponding background light timestamps may be saved for each row.

To organize frames, synchronization module 204 may build a timeline of frame events for displayed content frames, captured content frames, and in some examples, captured background light frames. In one example, synchronization module 208 may receive displayed content frames (e.g., test pattern 252), captured content frames (e.g., captured test pattern 254), and/or captured background light frames along with their respective timestamps (e.g., the display timestamp, the capture timestamp, and the background light timestamp as described above). For example, camera controller 574 may send captured frames 578, which may include captured content frame 554 and a captured background light frame, to camera ingest 514 along with the capture timestamp and the background light timestamp. Display controller 572 may send the display timestamp to host 570 to allow host 570 to build the timeline of frame events.

In some examples, synchronization module 208 may include a state machine such that building a timeline of frames may include inputting the display timestamp, the capture timestamp, and the background timestamp into the state machine.

In some examples, the timeline may be more granular than frames and may instead or in addition include a timeline of row events. For example, each row may have a display timestamp, capture timestamp, and background light timestamp such that the timeline may organize timestamps based on row.

Using the timeline, synchronization module 204 may match displayed content frames (e.g., test pattern 252) with respective captured content frames (e.g., captured test pattern 254) and (if available) captured background light frames. For example, synchronization module 204 may match test pattern 252 to captured test pattern 254 that has its capture timestamp offset from the display timestamp by the expected offset between the display timestamp and the capture timestamp (which may correspond to respective modulo values). Similarly and if appropriate, synchronization module 204 may match a captured background light frame to captured test pattern 254 (and/or test pattern 252) based on its background light timestamp being offset by the expected offset between the background light timestamp and the capture timestamp (and/or display timestamp), which in some examples may be based on respective modulo values.

In some examples, synchronization module 204 may create the timeline by matching corresponding displayed content frames, captured content frames, and/or captured background light frames to use the organization and/or sequence of frame events to match frames. In addition, in some examples, synchronization module 204 may match rows (e.g., corresponding rows from test pattern 252, captured test pattern 254, and/or the captured background light frame). Accordingly, synchronization module 204 may allow matching captured frames with corresponding displayed/rendered frames.

Returning to FIG. 1, the systems described herein may perform step 104 in a variety of ways. In one example, the displayed first test pattern and the displayed second test pattern may be captured simultaneously in a combined image. For example, disparity camera 324 may capture test patterns from display 322A and display 322B as a fused dot pattern of two different dot patterns, an example of which is illustrated in FIG. 4C.

FIG. 4C illustrates a fused test pattern 454 (which may correspond to captured test pattern 254). As illustrated in FIG. 4C, fused test pattern 454 may correspond to an overlaid combination of test pattern 452A and test pattern 452B, further corresponding to how disparity camera 324 may capture test pattern 452A and test pattern 452B. Pattern module 208 may generate different test patterns for each display (e.g., test pattern 452A and test pattern 452B) such that the different test patterns may be identifiable even if overlaid (e.g., as in fused test pattern 454). In addition, although FIGS. 4A-4C illustrate visually different shapes for each test pattern (e.g., dots with different shading for each of test pattern 452A and test pattern 452B) to illustrate the fused test pattern (e.g., fused test pattern 454 having dots of both shading patterns), in other examples, the visual features may appear similar and differ in location.

Moreover, in some implementations, captured test pattern 254 may be processed to reduce noise or otherwise improve visual quality to facilitate visual feature detection. For instance, background light and other ambient light-related noise may be removed from captured test pattern 254 (e.g., by using a background light frame as described herein). In some examples, such as if test pattern 252 was embedded in or otherwise hidden in a content frame before displaying on display 222, image data corresponding to the content frame may be removed from captured test pattern 254 such that visual features of test pattern 252, as captured, remains in captured test pattern 254.

Continuing with FIG. 1, at step 106 one or more of the systems described herein may determine a deviation between at least one of the captured first test pattern and the first test pattern or the captured second test pattern and the second test pattern. For example, detection module 206 may determine one or deviations of visual features between captured test pattern 254 and test pattern 252.

In some embodiments, the term "deviation" may refer to a mathematically and/or statistically significant difference between corresponding values, such as a difference in location/position as will be explained further below.

The systems described herein may perform step 106 in a variety of ways. In one example, determining the deviation further includes distinguishing the captured first test pattern from the captured second test pattern in the combined image. Detection module 206 may identify, from test pattern 252, a first set of expected features from the first test pattern and a second set of expected features from the second test pattern. For instance, detection module 206 may identify the first set of expected features from test pattern 452A and the second set of expected features from test pattern 452B. In some examples, detection module 206 may identify the first set of expected features by building a model of points based on feature locations from the first test pattern (e.g., a model of point locations of dots in test pattern 452A) and similarly identify the second set of expected features by building a second model of points based on feature locations from the second test pattern (e.g., a model of point locations of dots in test pattern 452B). Location values may be based on a coordinate system that may correspond to pixel locations or other appropriate reference coordinate system. Moreover, in some implementations, detection module 206 and/or pattern module 208 may build the models of points when pattern module 208 generates the corresponding test patterns. In other implementations, detection module 206 may identify the expected features from a rendered frame to be displayed on display 222.

Detection module 206 may also identify a plurality of observed features from the combined image (e.g., captured test pattern 254). Detection module 206 may identify the plurality of observed features by determining locations of identified features from the combined image. More specifically, detection module 206 may detect visual features based on feature detection and/or other computer vision, which may include identifying visually distinguishable pixels (which may differ in color and/or other values from neighboring pixels by at least a threshold value) from image data of captured test pattern 254 and determining corresponding locations (e.g., by calculating an appropriate center point of the visually distinguishable pixels), and/or using glint detection or similar eye-tracking processes. For instance, detection module 206 may detect, in fused test pattern 454, each of the dots. Although in some implementations, detection module 206 may further distinguish between different types of dots such as when the dots differ in style/color, in other implementations, the dots may be stylistically similar such that detection module 206 may identify every dot without distinguishing between types of dots. Further, in some implementations each display may be captured separately (e.g., via a separate camera for each display or a camera capturing each display one at a time) such that detection module 206 may not actively identify between the first and second sets of observed features.

Detection module 206 may therefore determine that a first set of observed features from the plurality of observed features corresponds to the first test pattern, based on similarity with the first set of expected features, and further that a second set of observed features from the plurality of observed features corresponds to the second test pattern, based on similarity with the second set of expected features. For example, detection module 206 may use the first model of points corresponding to test pattern 452A and match a nearest dot detected in fused test pattern 454 to determine the first set of observed features. Similarly, detection module 206 may use the second model of points corresponding to test pattern 452B and match a nearest dot detected in fused test pattern 454 to determine the second set of observed features. In some examples, having locations of dots in test pattern 452A by high-probabilistically different from locations of dots in test pattern 452B may reduce a likelihood of a dot being associated with a wrong test pattern.

In some examples, detection module 206 may distinguish the captured first test pattern from the captured second test pattern further by selecting the first set of observed features from the plurality of observed features based on a relationship matrix of points between the model of points and the first set of observed features, and further based on the relationship matrix between the second model of points and the second set of observed features. For instance, detection module 206 may generate the relationship matrix that may indicate relationships (e.g., distances) between the dots observed in fused test pattern 454 and the dots in test pattern 452A and test pattern 452B such that detection module 206 may use the relationship matrix to distinguish between dots corresponding to test pattern 452A or test pattern 452B.

Detection module 206 may determine a first deviation for the first display based on comparing the first set of observed features with the first set of expected features. For example, detection module 206 may use the relationship matrix to determine the deviation as a first transformation matrix (e.g., corresponding to rotation, scaling, shearing, reflection, orthogonal projection, etc.) between the locations of the observed features to the expected features. Detection module 206 may similarly determine a second deviation (e.g., a second transformation matrix) for the second display based on comparing the second set of observed features with the second set of expected features.

At step 108 one or more of the systems described herein may adjust output to at least one of the first display or the second display based on the determined deviation. For example, adjustment module 210 may adjust rendered frames as adjusted frame 256 to be output to display 222.

The systems described herein may perform step 108 in a variety of ways. In one example, adjustment module 210 may adjust rendered frames provided from host software 576. In some examples, adjustment module 210 may adjust the output by applying a first correction to a first output of the first display based on the first deviation, and similarly applying a second correction to a second output of the second display. The corrections may be based on the relationship matrix of points. For instance, the correction may correspond to the deviation and further may correspond to the transformation matrix as described above. A first correction may correspond to a first transformation matrix, which when applied to fused test pattern 454, would result in the dots corresponding to test pattern 452A being positioned as in test pattern 452A. A second correction may correspond to a second transformation matrix, which when applied to fused test pattern 454, would result in the dots corresponding to test pattern 452B being positioned as in test pattern 452B.

In other words, adjustment module 210 may apply a first transformation matrix to frames for the first display (e.g., display 322A) to reverse the first deviation as calculated between the captured and original first test pattern, and may apply a second transformation matrix to frames for the second display (e.g., display 322B) to reverse the second deviation as calculated between the captured and original second test pattern. Moreover, in some implementations, adjustment module 210 may selectively apply corrections to displays and/or frames. For example, adjustment module 210 may determine no significant deviation (e.g., the corresponding transformation matrix may not satisfy a transformation threshold). In addition, one or more of steps 102, 104, 106, and 108 may be repeated as needed, such that the test patterns and/or corrections may be dynamically updated and adjustment module 210 may accordingly apply corrections as needed.

Figure 8:
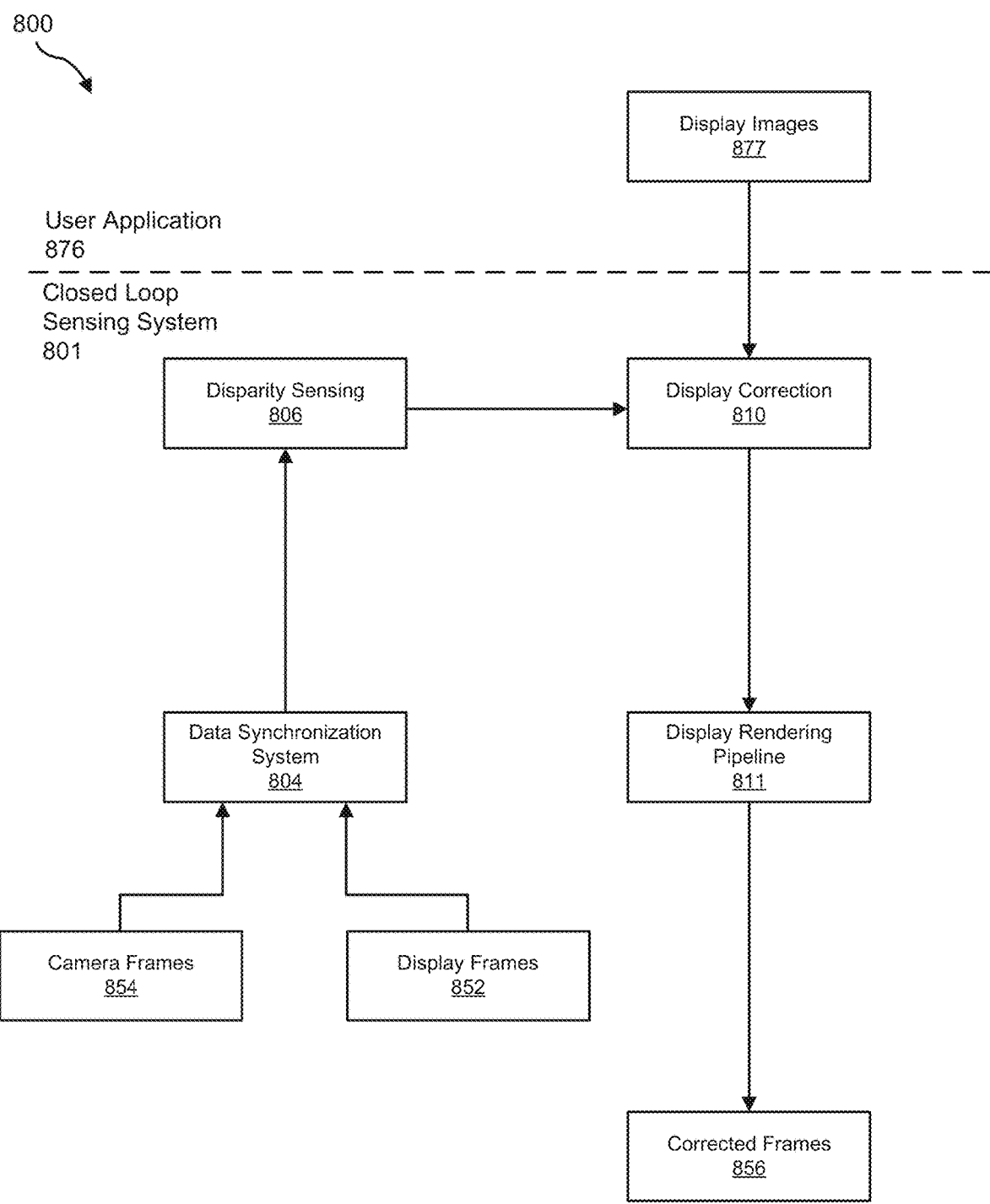
FIG. 8 is a diagram of an exemplary closed loop system for binocular disparity detection and correction.

In some implementations, a binocular disparity detection/estimation and correction system as described herein may correspond to a closed loop system. FIG. 8 illustrates a data flow diagram for a system 800 that may correspond to system 200, device 300, system 500, and/or any other system or device described herein. System 800 may be conceptually divided into a user application 876 (e.g., a software or other user application such as host software 576 that may generate content frames) and a closed loop sensing system 801. User application 876 may include display images 877 (e.g., rendered content frames from user application 876).

As illustrated in FIG. 8, closed loop sensing system 801 may include a disparity sensing 806 (corresponding to detection module 206), display correction 810 (corresponding to adjustment module 210), data synchronization system 804 (corresponding to synchronization module 204), camera frames 854 (corresponding, in some instances, to captured test pattern 254) display frames 852 (corresponding, in some instances, to test pattern 252), display rendering pipeline 811 (corresponding, in part, to display controller 572), and corrected frames 856 (corresponding to adjusted frame 256).

A camera may capture camera frames 854 (e.g., as in step 104) with timestamps (as described herein) for matching with corresponding display frame 852 (e.g., as in step 102) with timestamps (as described herein). In some examples, display frames 852 may correspond to display images 877, more specifically a prior iteration or instance of display images 877. Data synchronization system 804 may create a timeline (as described herein) to match camera frames 854 with display frames 852 for analysis by disparity sensing 806 (e.g., as in step 106).

Camera frames 854 and display frames 852 may include test patterns (see, e.g., FIGS. 4A-4C) such that disparity sensing 806 may estimate binocular disparity and send display correction information to display correction 810. Display correction 810 may apply display correction to display images 877 based on the received display correction information (e.g., as in step 106). In some examples, display images 877 may correspond to data for rendering frames such that applying the display correction may alter this data. Display rendering pipeline 811 may then use the altered data for rendering frames as corrected frames 856 for display on a display (e.g., display 222). Additionally, the flow described in FIG. 8 may be applied to multiple displays, for instance by processing frames in parallel (e.g., having parallel closed loop sensing system 801 and/or portions thereof for each display) and/or interleaved (e.g., closed loop sensing system 801 providing separate corrections for frames intended for different displays).

As detailed above, a display system may have the projectors mounted in the temple arm to reduce the frame form factor. In this configuration, if there is relative motion between the main waveguide and the projectors, the user may experience binocular disparity. A disparity sensor may be mounted in the nose bridge to capture fused images projected on the left and right projectors. The disparity sensor may function as a direct measurement ground truth camera that captures what the user's eyes may see. Pre-designed dot patterns (e.g., disparity signals, see FIGS. 4A and 4B) may be periodically displayed on the projectors. The fused dot patterns are then captured by the disparity sensor (see, FIG. 4C). The systems and methods described herein estimate the amount of binocular disparity introduced by the frame deformation given the fused dot pattern images captured by the disparity sensor.

For example, as described herein, the fused dot pattern image (or disparity signal) captured by the disparity sensor may be given to a detection module (e.g., detection module 206) to locate the dots. In some examples, a glint detection algorithm similar to that used in eye tracking applications to locate the glints in human eyes may be used. Once the dot locations are determined, the groups of dots from the left display and right display are separated.

In some examples, the detection module may use a Random Sample Consensus Algorithm (RANSAC) may be used to separate left from right disparity signals. Given the expected locations of all the dots from the left display, the detection module may use RANSAC to identify the spatially perturbed version of those dots as inliers, and the dots from the right display as outliers. As a result, the detection module, using RANSAC, may effectively separate the dots from the two displays. During this separation process, the detection module may also use RANSAC to produce the misalignment between the separated disparity signals and their expected positions (assuming there is no binocular disparity with respect to the rendered frames). This misalignment corresponds to the movement between the projector and the main waveguide as described herein. Once the misalignment is known, the graphics pipeline may effectively correct future images to compensate for the misalignment.

Example Embodiments

Example 1: A computer-implemented method comprising: displaying a first test pattern on a first display and a second test pattern on a second display; capturing the displayed first test pattern and the displayed second test pattern; determining a deviation between at least one of the captured first test pattern and the first test pattern or the captured second test pattern and the second test pattern; and adjusting output to at least one of the first display or the second display based on the determined deviation.

Example 2: The method of Example 1, further comprising capturing the displayed first test pattern and the displayed second test pattern simultaneously in a combined image, wherein the first test pattern is high-probabilistically different from the second test pattern.

Example 3: The method of Example 2, wherein determining the deviation further comprises distinguishing the captured first test pattern from the captured second test pattern in the combined image.

Example 4: The method of Example 3, wherein distinguishing the captured first test pattern from the captured second test pattern further comprises: identifying a first set of expected features from the first test pattern and a second set of expected features from the second test pattern; identifying a plurality of observed features from the combined image; and determining that a first set of observed features from the plurality of observed features corresponds to the first test pattern based on similarity with the first set of expected features and that a second set of observed features from the plurality of observed features corresponds to the second test pattern based on similarity with the second set of expected features.

Example 5: The method of Example 4, wherein: determining the deviation further comprises determining a first deviation for the first display based on comparing the first set of observed features with the first set of expected features; and adjusting the output further comprises applying a first correction to a first output of the first display based on the first deviation.

Example 6: The method of Example 5, wherein: identifying the first set of expected features comprises building a model of points based on feature locations from the first test pattern; identifying the plurality of observed features comprises determining locations of identified features from the combined image; distinguishing the captured first test pattern from the captured second test pattern further comprises selecting the first set of observed features from the plurality of observed features based on a relationship matrix of points between the model of points and the first set of observed features; and determining the first deviation is based on the relationship matrix of points.

Example 7: The method of Example 6, wherein the first correction is based on the relationship matrix of points.

Example 8: The method of any of Examples 1-7, further comprising displaying at least one of the first test pattern or the second test pattern when a user blink is detected.

Example 9: The method of any of Examples 1-8, further comprising displaying at least one of the first test pattern or the second test pattern when a user gaze is detected away from at least one of the first display or the second display.

Example 10: The method of any of Examples 1-9, further comprising displaying at least one of the first test pattern or the second test pattern hidden in an output frame.

Example 11: The method of any of Examples 1-10, further comprising displaying the first test pattern asynchronously with the second test pattern.

Example 12: A system comprising: at least one physical processor; a first display; a second display; an image sensor device; and physical memory comprising computer-executable instructions that, when executed by the physical processor, cause the physical processor to: display a first test pattern on the first display and a second test pattern on the second display; capture, using the image sensor device, the displayed first test pattern and the displayed second test pattern; determine a deviation between at least one of the captured first test pattern and the first test pattern or the captured second test pattern and the second test pattern; and adjust output to at least one of the first display or the second display based on the determined deviation.

Example 13: The system of Example 12, wherein the image sensor device is configured to capture the displayed first test pattern and the displayed second test pattern simultaneously in a combined image, wherein the first test pattern is high-probabilistically different from the second test pattern.

Example 14: The system of Example 13, wherein the instructions for determining the deviation further comprise instructions for distinguishing the captured first test pattern from the captured second test pattern in the combined image by: identifying a first set of expected features from the first test pattern and a second set of expected features from the second test pattern; identifying a plurality of observed features from the combined image; and determining that a first set of observed features from the plurality of observed features corresponds to the first test pattern based on similarity with the first set of expected features and that a second set of observed features from the plurality of observed features corresponds to the second test pattern based on similarity with the second set of expected features.

Example 15: The system of Example 14, wherein: the instructions for determining the deviation further comprise instructions for determining a first deviation for the first display based on comparing the first set of observed features with the first set of expected features; and the instructions for adjusting the output further comprise instructions for applying a first correction to a first output of the first display based on the first deviation.

Example 16: The system of claim 15, wherein: the instructions for identifying the first set of expected features comprise instructions for building a model of points based on feature locations from the first test pattern; the instructions for identifying the plurality of observed features comprise instructions for determining locations of identified features from the combined image; the instructions for distinguishing the captured first test pattern from the captured second test pattern further comprise instructions for selecting the first set of observed features from the plurality of observed features based on a relationship matrix of points between the model of points and the first set of observed features; determining the first deviation is based on the relationship matrix of points; and the first correction is based on the relationship matrix of points.

Example 17: The system of any of Examples 12-16, wherein the instructions for further displaying the first and second test patterns comprise at least one of: instructions for displaying at least one of the first test pattern or the second test pattern when a user blink is detected; instructions for displaying at least one of the first test pattern or the second test pattern when a user gaze is detected away from at least one of the first display or the second display; instructions for displaying at least one of the first test pattern or the second test pattern hidden in an output frame; and instructions for displaying the first test pattern asynchronously with the second test pattern.

Example 18: A non-transitory computer-readable medium comprising one or more computer-executable instructions that, when executed by at least one processor of a computing device, cause the computing device to: display a first test pattern on a first display and a second test pattern on a second display; capture the displayed first test pattern and the displayed second test pattern; determine a deviation between at least one of the captured first test pattern and the first test pattern or the captured second test pattern and the second test pattern; and adjust output to at least one of the first display or the second display based on the determined deviation.

Example 19: The non-transitory computer-readable medium of Example 18, further comprising instructions for capturing the displayed first test pattern and the displayed second test pattern simultaneously in a combined image, wherein the first test pattern is high-probabilistically different from the second test pattern.

Example 20: The non-transitory computer-readable medium of Example 19, wherein: the instructions for determining the deviation further comprises distinguishing the captured first test pattern from the captured second test pattern in the combined image; the instructions for determining the deviation further comprise instructions for determining a first deviation for the first display based on comparing the first set of observed features with the first set of expected features; and the instructions for adjusting the output further comprise instructions for applying a first correction to a first output of the first display based on the first deviation.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
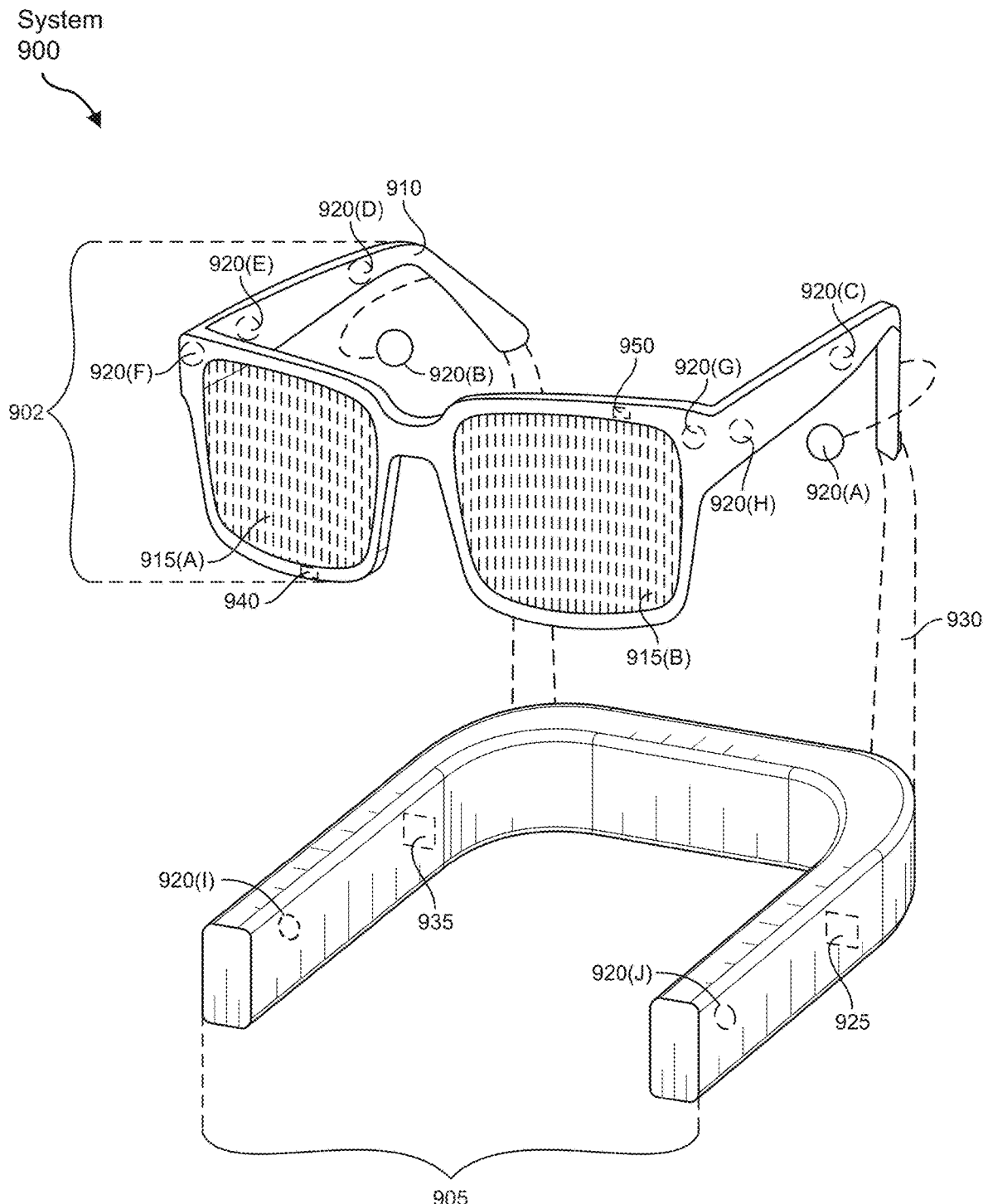
FIG. 9 is an illustration of exemplary augmented-reality glasses that may be used in connection with embodiments of this disclosure.
Figure 10:
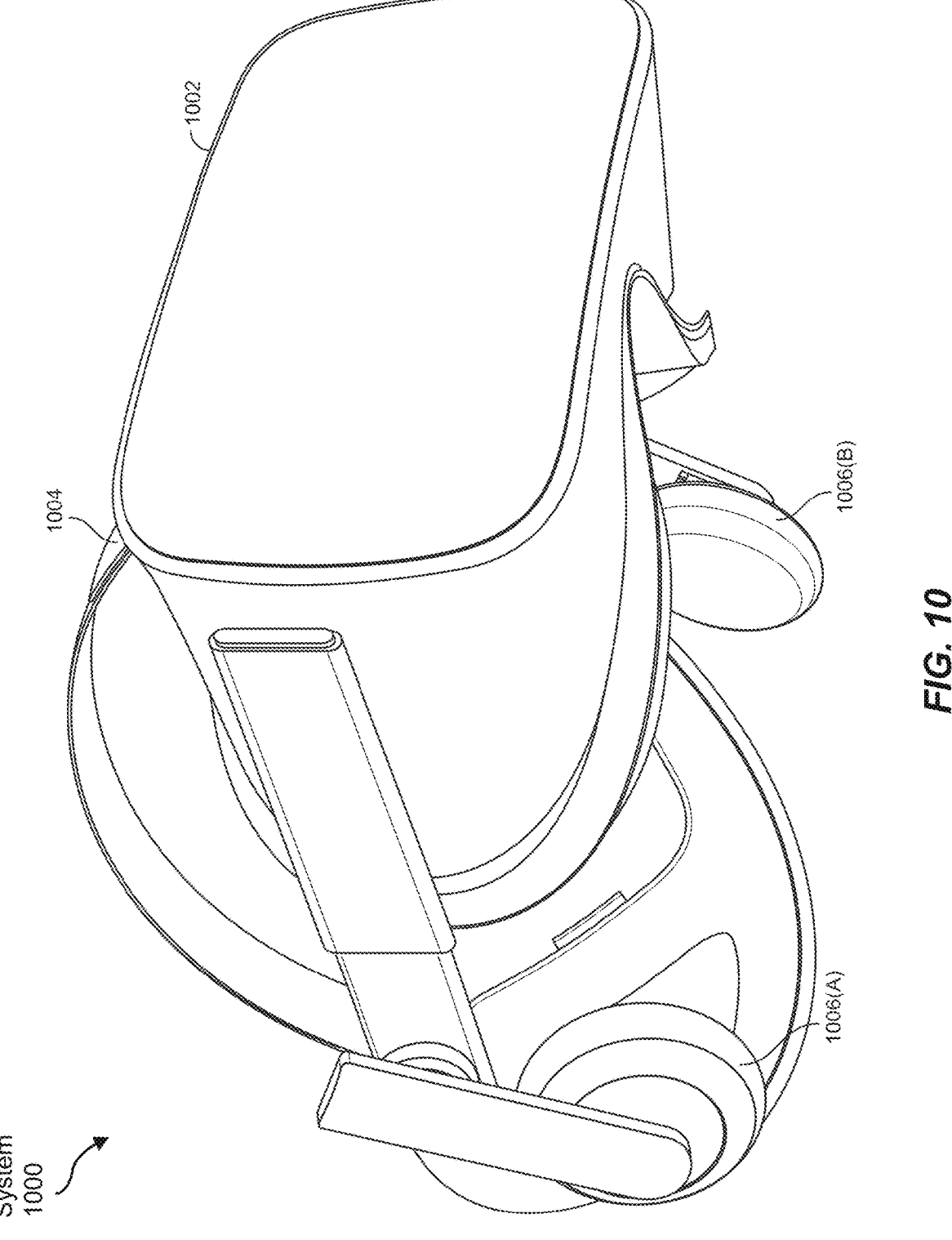
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920 (G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 11:
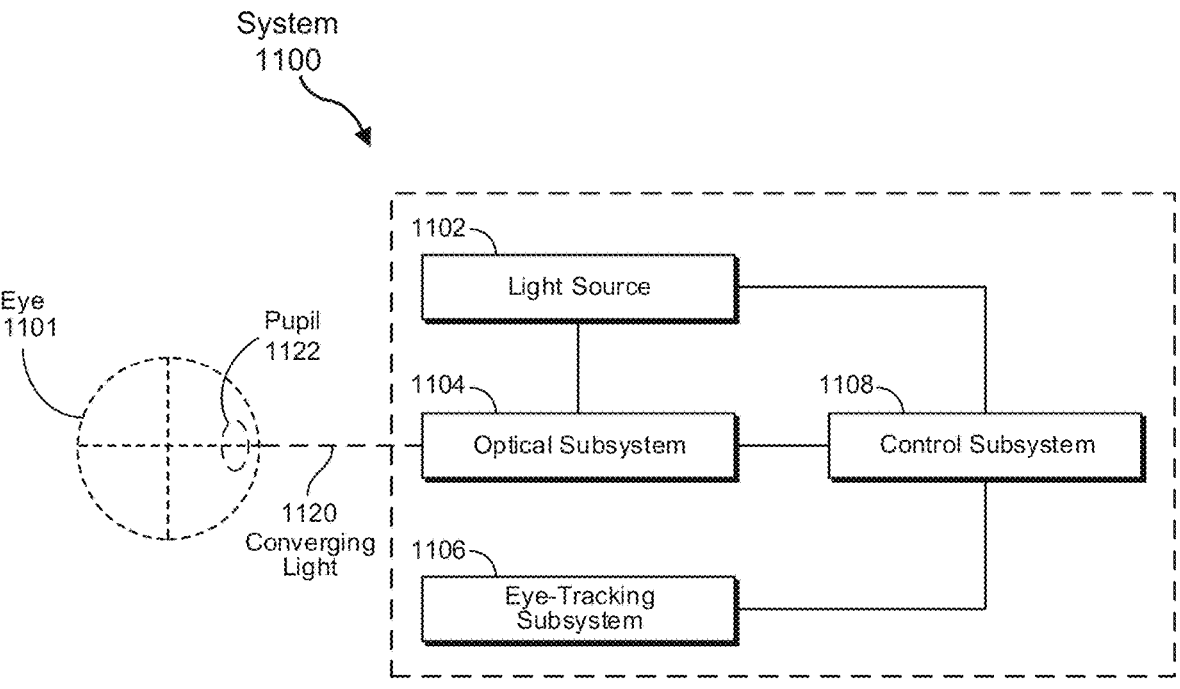
FIG. 11 an illustration of an exemplary system that incorporates an eye-tracking subsystem capable of tracking a user's eye(s).

FIG. 11 is an illustration of an exemplary system 1100 that incorporates an eye-tracking subsystem capable of tracking a user's eye(s). As depicted in FIG. 11, system 1100 may include a light source 1102, an optical subsystem 1104, an eye-tracking subsystem 1106, and/or a control subsystem 1108. In some examples, light source 1102 may generate light for an image (e.g., to be presented to an eye 1101 of the viewer). Light source 1102 may represent any of a variety of suitable devices. For example, light source 1102 can include a two-dimensional projector (e.g., a LCOS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1104 may receive the light generated by light source 1102 and generate, based on the received light, converging light 1120 that includes the image. In some examples, optical subsystem 1104 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1120. Further, various mechanical couplings may serve to maintain the relative spacing and/or the orientation of the optical components in any suitable combination.

In one embodiment, eye-tracking subsystem 1106 may generate tracking information indicating a gaze angle of an eye 1101 of the viewer. In this embodiment, control subsystem 1108 may control aspects of optical subsystem 1104 (e.g., the angle of incidence of converging light 1120) based at least in part on this tracking information. Additionally, in some examples, control subsystem 1108 may store and utilize historical tracking information (e.g., a history of the tracking information over a given duration, such as the previous second or fraction thereof) to anticipate the gaze angle of eye 1101 (e.g., an angle between the visual axis and the anatomical axis of eye 1101). In some embodiments, eye-tracking subsystem 1106 may detect radiation emanating from some portion of eye 1101 (e.g., the cornea, the iris, the pupil, or the like) to determine the current gaze angle of eye 1101. In other examples, eye-tracking subsystem 1106 may employ a wavefront sensor to track the current location of the pupil.

Any number of techniques can be used to track eye 1101. Some techniques may involve illuminating eye 1101 with infrared light and measuring reflections with at least one optical sensor that is tuned to be sensitive to the infrared light. Information about how the infrared light is reflected from eye 1101 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 1106 may be digitized (i.e., converted to an electronic signal). Further, the sensor may transmit a digital representation of this electronic signal to one or more processors (for example, processors associated with a device including eye-tracking subsystem 1106). Eye-tracking subsystem 1106 may include any of a variety of sensors in a variety of different configurations. For example, eye-tracking subsystem 1106 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1106 to track the movement of eye 1101. In another example, these processors may track the movements of eye 1101 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1106 may be programmed to use an output of the sensor(s) to track movement of eye 1101. In some embodiments, eye-tracking subsystem 1106 may analyze the digital representation generated by the sensors to extract eye rotation information from changes in reflections. In one embodiment, eye-tracking subsystem 1106 may use corneal reflections or glints (also known as Purkinje images) and/or the center of the eye's pupil 1122 as features to track over time.

In some embodiments, eye-tracking subsystem 1106 may use the center of the eye's pupil 1122 and infrared or near-infrared, non-collimated light to create corneal reflections. In these embodiments, eye-tracking subsystem 1106 may use the vector between the center of the eye's pupil 1122 and the corneal reflections to compute the gaze direction of eye 1101. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1106 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1101 may act as a retroreflector as the light reflects off the retina, thereby creating a bright pupil effect similar to a red-eye effect in photography. If the illumination source is offset from the optical path, then the eye's pupil 1122 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1108 may control light source 1102 and/or optical subsystem 1104 to reduce optical aberrations (e.g., chromatic aberrations and/or monochromatic aberrations) of the image that may be caused by or influenced by eye 1101. In some examples, as mentioned above, control subsystem 1108 may use the tracking information from eye-tracking subsystem 1106 to perform such control. For example, in controlling light source 1102, control subsystem 1108 may alter the light generated by light source 1102 (e.g., by way of image rendering) to modify (e.g., pre-distort) the image so that the aberration of the image caused by eye 1101 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

Figure 12:
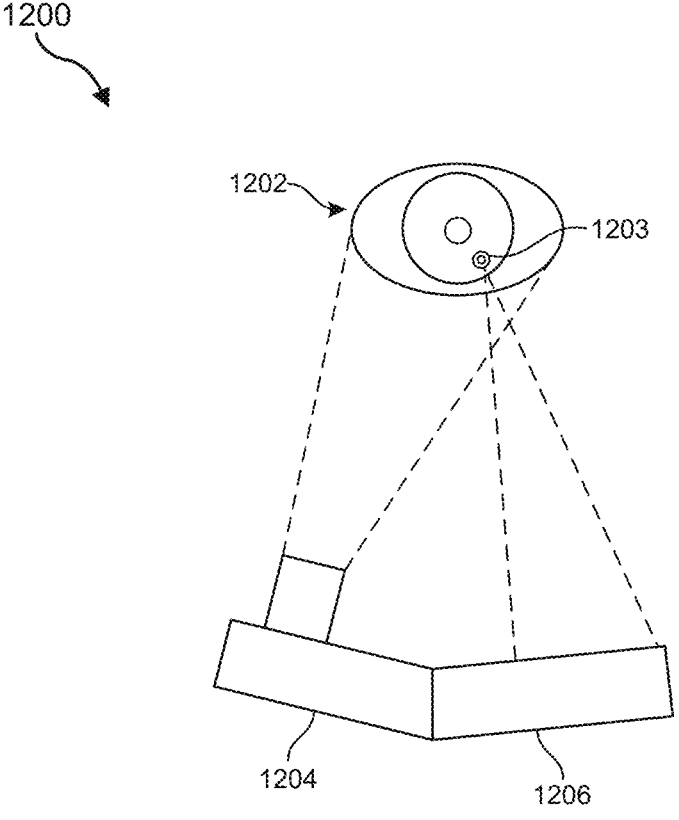
FIG. 12 is a more detailed illustration of various aspects of the eye-tracking subsystem illustrated in FIG. 11.
Figure 12:
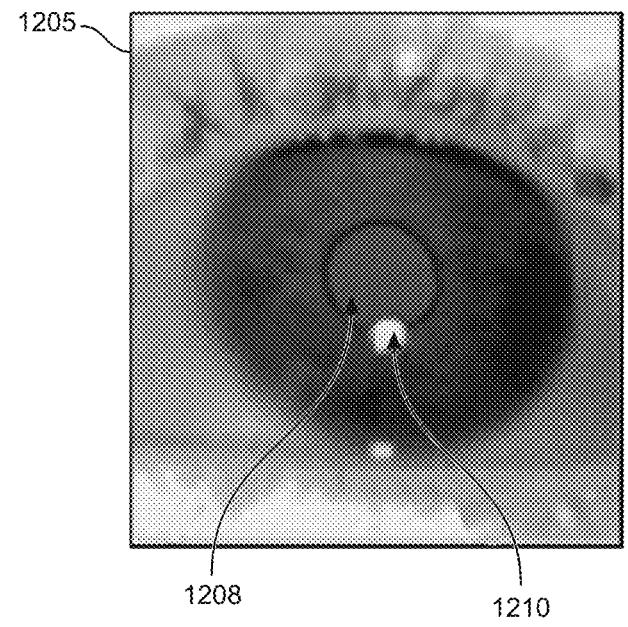

FIG. 12 is a more detailed illustration of various aspects of the eye-tracking subsystem illustrated in FIG. 11. As shown in this figure, an eye-tracking subsystem 1200 may include at least one source 1204 and at least one sensor 1206. Source 1204 generally represents any type or form of element capable of emitting radiation. In one example, source 1204 may generate visible, infrared, and/or near-infrared radiation. In some examples, source 1204 may radiate non-collimated infrared and/or near-infrared portions of the electromagnetic spectrum towards an eye 1202 of a user. Source 1204 may utilize a variety of sampling rates and speeds. For example, the disclosed systems may use sources with higher sampling rates in order to capture fixational eye movements of a user's eye 1202 and/or to correctly measure saccade dynamics of the user's eye 1202. As noted above, any type or form of eye-tracking technique may be used to track the user's eye 1202, including optical-based eye-tracking techniques, ultrasound-based eye-tracking techniques, etc.

Sensor 1206 generally represents any type or form of element capable of detecting radiation, such as radiation reflected off the user's eye 1202. Examples of sensor 1206 include, without limitation, a charge coupled device (CCD), a photodiode array, a complementary metal-oxide-semiconductor (CMOS) based sensor device, and/or the like. In one example, sensor 1206 may represent a sensor having predetermined parameters, including, but not limited to, a dynamic resolution range, linearity, and/or other characteristic selected and/or designed specifically for eye tracking.

As detailed above, eye-tracking subsystem 1200 may generate one or more glints. As detailed above, a glint 1203 may represent reflections of radiation (e.g., infrared radiation from an infrared source, such as source 1204) from the structure of the user's eye. In various embodiments, glint 1203 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 12 shows an example image 1205 captured by an eye-tracking subsystem, such as eye-tracking subsystem 1200. In this example, image 1205 may include both the user's pupil 1208 and a glint 1210 near the same. In some examples, pupil 1208 and/or glint 1210 may be identified using an artificial-intelligence-based algorithm, such as a computer-vision-based algorithm. In one embodiment, image 1205 may represent a single frame in a series of frames that may be analyzed continuously in order to track the eye 1202 of the user. Further, pupil 1208 and/or glint 1210 may be tracked over a period of time to determine a user's gaze.

In one example, eye-tracking subsystem 1200 may be configured to identify and measure the inter-pupillary distance (IPD) of a user. In some embodiments, eye-tracking subsystem 1200 may measure and/or calculate the IPD of the user while the user is wearing the artificial reality system. In these embodiments, eye-tracking subsystem 1200 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's inter-pupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position.

Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1100 and/or eye-tracking subsystem 1200 may be incorporated into augmented-reality system 900 in FIG. 9 and/or virtual-reality system 1000 in FIG. 10 to enable these systems to perform various eye-tracking tasks (including one or more of the eye-tracking operations described herein).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data, output a result of the transformation to determine deviations, use the result of the transformation to determine a correction, and store the result of the transformation to correct output frames. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), elec-tronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specifi-cation and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specifi-cation and claims, are interchangeable with and have the same meaning as the word "comprising."

What is claimed is:

1. A computer-implemented method comprising:
generating a first test pattern and a second test pattern, wherein feature locations of the first test pattern are high-probabilistically different from feature locations of the second test pattern;
displaying the first test pattern on a first display and the second test pattern on a second display;
capturing the displayed first test pattern and the displayed second test pattern simultaneously from the first display and the second display in a combined image;
determining a deviation between at least one of the captured first test pattern from the combined image and the first test pattern or the captured second test pattern from the combined image and the second test pattern; and
adjusting output to at least one of the first display or the second display based on the determined deviation.

2. The method of claim 1, wherein the combined image includes the captured first test pattern overlaid with the captured second test pattern and wherein the first test pattern is high-probabilistically different from the second test pat-tern such that the feature locations are outside of a statistical distance threshold of each other.

3. The method of claim 2, wherein determining the deviation further comprises distinguishing the captured first test pattern from the captured second test pattern in the combined image.

4. The method of claim 3, wherein distinguishing the captured first test pattern from the captured second test pattern further comprises:
identifying a first set of expected features from the first test pattern and a second set of expected features from the second test pattern;
identifying a plurality of observed features from the combined image; and
determining that a first set of observed features from the plurality of observed features corresponds to the first test pattern based on similarity with the first set of expected features and that a second set of observed features from the plurality of observed features corre-sponds to the second test pattern based on similarity with the second set of expected features.

5. The method of claim 4, wherein:
determining the deviation further comprises determining a first deviation for the first display based on comparing the first set of observed features with the first set of expected features; and
adjusting the output further comprises applying a first correction to a first output of the first display based on the first deviation.

6. The method of claim 5, wherein:
identifying the first set of expected features comprises building a model of points based on feature locations from the first test pattern;
identifying the plurality of observed features comprises determining locations of identified features from the combined image;
distinguishing the captured first test pattern from the captured second test pattern further comprises selecting the first set of observed features from the plurality of observed features based on a relationship matrix of points between the model of points and the first set of observed features; and
determining the first deviation is based on the relationship matrix of points.

7. The method of claim 6, wherein the first correction is based on the relationship matrix of points.

8. The method of claim 1, further comprising displaying at least one of the first test pattern or the second test pattern when a user blink is detected.

9. The method of claim 1, further comprising displaying at least one of the first test pattern or the second test pattern when a user gaze is detected away from at least one of the first display or the second display.

10. The method of claim 1, further comprising displaying at least one of the first test pattern or the second test pattern hidden in an output frame.

11. The method of claim 1, further comprising displaying the first test pattern asynchronously with the second test pattern.

12. A system comprising:
at least one physical processor;
a first display;
a second display;

an image sensor device; and physical memory comprising computer-executable instructions that, when executed by the physical processor, cause the physical processor to:

generate a first test pattern and a second test pattern, wherein feature locations of the first test pattern are high-probabilistically different from feature locations of the second test pattern;

display the first test pattern on the first display and the second test pattern on the second display;

capture, using the image sensor device, the displayed first test pattern and the displayed second test pattern simultaneously from the first display and the second display in a combined image;

determine a deviation between at least one of the captured first test pattern from the combined image and the first test pattern or the captured second test pattern from the combined image and the second test pattern; and adjust output to at least one of the first display or the second display based on the determined deviation.

13. The system of claim 12, wherein the combined image includes the captured first test pattern overlaid with the captured second test pattern and wherein the first test pattern is high-probabilistically different from the second test pattern such that the feature locations are outside of a statistical distance threshold of each other.

14. The system of claim 13, wherein the instructions for determining the deviation further comprise instructions for distinguishing the captured first test pattern from the captured second test pattern in the combined image by:

identifying a first set of expected features from the first test pattern and a second set of expected features from the second test pattern;

identifying a plurality of observed features from the combined image; and determining that a first set of observed features from the plurality of observed features corresponds to the first test pattern based on similarity with the first set of expected features and that a second set of observed features from the plurality of observed features corresponds to the second test pattern based on similarity with the second set of expected features.

15. The system of claim 14, wherein:

the instructions for determining the deviation further comprise instructions for determining a first deviation for the first display based on comparing the first set of observed features with the first set of expected features; and the instructions for adjusting the output further comprise instructions for applying a first correction to a first output of the first display based on the first deviation.

16. The system of claim 15, wherein:

the instructions for identifying the first set of expected features comprise instructions for building a model of points based on feature locations from the first test pattern;

the instructions for identifying the plurality of observed features comprise instructions for determining locations of identified features from the combined image;

the instructions for distinguishing the captured first test pattern from the captured second test pattern further comprise instructions for selecting the first set of observed features from the plurality of observed features based on a relationship matrix of points between the model of points and the first set of observed features;

determining the first deviation is based on the relationship matrix of points; and the first correction is based on the relationship matrix of points.

17. The system of claim 12, wherein the instructions for further displaying the first and second test patterns comprise at least one of:

instructions for displaying at least one of the first test pattern or the second test pattern when a user blink is detected;

instructions for displaying at least one of the first test pattern or the second test pattern when a user gaze is detected away from at least one of the first display or the second display;

instructions for displaying at least one of the first test pattern or the second test pattern hidden in an output frame; and instructions for displaying the first test pattern asynchronously with the second test pattern.

18. A non-transitory computer-readable medium comprising one or more computer-executable instructions that, when executed by at least one processor of a computing device, cause the computing device to:

generate a first test pattern and a second test pattern, wherein feature locations of the first test pattern are high-probabilistically different from feature locations of the second test pattern;

display a first test pattern on a first display and a second test pattern on a second display;

capture the displayed first test pattern and the displayed second test pattern simultaneously from the first display and the second display in a combined image;

determine a deviation between at least one of the captured first test pattern from the combined image and the first test pattern or the captured second test pattern from the combined image and the second test pattern; and adjust output to at least one of the first display or the second display based on the determined deviation.

19. The non-transitory computer-readable medium of claim 18, wherein the combined image includes the captured first test pattern overlaid with the captured second test pattern and wherein the first test pattern is high-probabilistically different from the second test pattern such that the feature locations are outside of a statistical distance threshold of each other.

20. The non-transitory computer-readable medium of claim 19, wherein:

the instructions for determining the deviation further comprises distinguishing the captured first test pattern from the captured second test pattern in the combined image;

the instructions for determining the deviation further comprise instructions for determining a first deviation for the first display based on comparing a first set of observed features with a first set of expected features; and the instructions for adjusting the output further comprise instructions for applying a first correction to a first output of the first display based on the first deviation.

* * * * *